United States Patent Office 3,544,521
Patented Dec. 1, 1970

3,544,521
PROCESS OF PREPARING OXYMETHYLENE COPOLYMERS
Calvin N. Wolf, Princeton, N.J., assignor to Ethyl Corporation, New York, N.Y., a corporation of Virginia
No Drawing. Continuation of application Ser. No. 220,062, Aug. 28, 1962. This application Feb. 21, 1967, Ser. No. 617,712
Int. Cl. C08g 1/18
U.S. Cl. 260—73    8 Claims

ABSTRACT OF THE DISCLOSURE

Preparation of a linear thermoplastic oxymethylene copolymer of a formaldehyde and a dihydrocarbyl ester of a dicarboxylic acid. The diester of the dicarboxylic acid has a formula

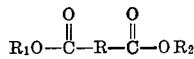

wherein $R_1$ and $R_2$ are monovalent, hydrocarbon radicals having up to about 32 carbon atoms each of which may, for example, be an alkyl, cycloalkyl, aryl or alkaryl group. R is a divalent hydrocarbon radical having from about 1 to about 12 carbon atoms and is an alkylene, arylene or cycloalkylene group. These polymers exhibit the desired charcteristics of polyoxymethylene in that they are tough, resilient, resistant to thermal degradation and have enhanced resistance to degradation when in contact with strongly alkaline substances.

---

This application is a continuation of my copending application Ser. No. 220,062, filed Aug. 28, 1962, for "Composition of Matter," now abandoned.

This invention relates to novel and useful high molecular weight, high melting interpolymers composed primarily of formaldehyde. This invention further relates to processes for producing these novel interpolymers.

In the past, Staudinger, in "Die Hochmolecularen Organischen Verbindunger" (1932), set forth a process of polymerizing formaldehyde. The formaldehyde polymers obtained by this process, when aged in air at 105° C. resulted in degradation or "unzipping" to monomeric formaldehyde. McDonald, in U.S. Pat. 2,768,994, described a new polymerization process whereby high molecular weight formaldehyde homopolymers could be produced which were tough and possessed a higher degree of thermal stability than the low molecular weight polymers of Staudinger. The polymer produced by McDonald, which exhibited excellent properties at low temperatures also tended to degrade or "unzip" at temperatures at which the polymer would be worked, e.g., molded. Thus, in the molding operations which require high temperatures, it was found that polyformaldehyde would degrade rendering the polymer relatively useless for this necessary operation.

Many methods have been attempted to stabilize the high molecular weight formaldehyde homopolymers. A typical method employed utilized the compounding with the formaldehyde polymer of stabilizers such as hydrazines (U.S. Pat. 2,810,708), phenols (U.S. Pat. 2,871,220), ureas, thioureas (U.S. Pat. 2,893,972), amines (U.S. Pats. 2,920,059, and 2,936,298), and benzophenones (Australian Pat. 230,163). The art has taught that these stabilizers are compounded into the polymer after the polymerization process. These stabilizers seem to prevent to some extent oxidation, thermal deterioration and photo degradation, however, degradation is still experienced at high temperatures in the presence of air.

Other methods employed to prevent the "unzipping" of the polyformaldehyde are the "end capping" of the free hydroxyl groups on the chain ends of the polymer as set forth, for example, in U.S. Pat. 2,964,500. This end capping procedure is successful to a certain degree but total success is not experienced since these end capped polymers also degrade at high temperatures or in the presence of caustic or other strongly alkaline substances.

Another method of stabilization includes the essentially complete removal of the polymerization catalyst from the polymer since it is believed that the presence of the polymerization catalyst causes degradation or "unzipping" (U.S. Pat. 2,989,509). Combinations of the foregoing have also been utilized (Austrialian Pat. 229,481). Copolymerization of formaldehyde with alkylene carbonates as set forth in U.S. Pat. 3,012,990, has also been achieved in the attempt to produce a thermally stable polymer.

Another method of preventing degradation or unzipping of the formaldehyde polymer has been the copolymerization of trioxane with cyclic ethers such as ethylene oxide to produce a polymer having adjacent carbon atoms breaking the alternating oxygen to carbon linkage (U.S. Pat. 3,027,352).

It is therefore an object of the present invention to provide novel interpolymers which are stable and resistant to oxidative deteration, thermal deterioration, and caustic degradation. It is a further object of the present invention to provide new, novel polymers which are tough, strong, flexible, and elastic in nature. It is a still further object of the present invention to provide novel interpolymers of formaldehyde or trioxane and a dihydrocarbyl ester of a dicarboxylic acid which have the qualities outlined hereinabove. It is a further object of the present invention to provide a process for producing novel polymers having thermal and oxidative stability and exhibiting properties of toughness, strength, and resilience. A particular object of this invention is to provide novel high molecular weight thermally stable formaldehyde-ester polymers which have substantially greater resistance to caustic degradation than high molecular weight polyoxymethylene homopolymers. Other objects of the invention will be apparent from the ensuing description.

It has now been found that the above and other objects are accomplished by the provision of a polymer of a formaldehyde and a dihydrocarbyl ester of a dicarboxylic acid. The dihydrocarbyl ester of the dicarboxylic acid generally has the formula:

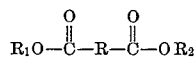

wherein $R_1$ and $R_2$ are organo groups having up to about 32 carbon atoms each of which can be alkyl, cycloalkyl, aryl, and alkaryl groups; R is a divalent hydrocarbon radical having from about 1 to about 12 carbon atoms and is for example an alkylene, arylene or cycloalkylene group. The preferred esters are those in which $R_1$ and $R_2$ have from about 1 to about 18 carbon atoms each and R has from about 2 to about 8 carbon atoms, since thermally stable polymers are obtained when these particular esters are employed and chemically combined in the polymer chain. Thus, a few typical examples of these esters are diethyl maleate, dibutyl succinate, diallyl phthalate and the like. Generally the amount of ester monomer present in the polymers of this invention ranges from about 0.1 mole percent to about 20 mole percent based on the weight of the polymer. The preferred amount of diester monomer present in the polymer generally ranges from about .5 to about 5 mole percent. Excellent polymers are obtained especially when the preferred mole percentage of diester monomer is employed. These polymers exhibit the desirable characteristics of polyoxymethylene in that they are tough, resilient, and resistant to thermal degradation. But unlike the high molecular weight homopolymers of polyoxymethylene, the present novel interpolymers have enhanced resistance to degradation when in contact with strongly alkaline substances.

A formula which shows the probable theoretical molecular structure of the novel polymers of this invention is:

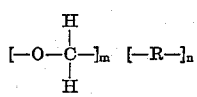

wherein R is a dihydrocarbyl ester group, M is an integer representing the total number of polyoxymethylene units in the polymer and N is a smaller integer representing the total number of dihydrocarbyl ester groups chemically combined intermittently at random throughout the polyoxymethylene structure. Therefore N is from about 0.1 to about 20 percent of M.

The novel interpolymers of this invention have high molecular weights and high melting points. The molecular weights of these novel interpolymers generally range from about 5,000 to about 200,000. However, the preferred molecular weights range from about 10,000 to about 150,000 since the copolymers obtained within this range are more easily adapted for the ultimate end use, e.g., molding, drawing fibers, and the like. The molecular weight ranges are a direct function of the inherent viscosity. Thus, inherent viscosities ranging from about 0.3 to about 5.0 are desirable in the polymers of this invention. The most preferred inherent viscosities range from about 0.5 to 3.0 since these viscosities correspond to polymers within the preferred molecular weight range. The inherent viscosity is preferably measured at 0.5 percent by weight in p-chlorophenol containing 2 percent of alpha-pinene at 60° C. The melting point (polymer melt temperature) ranges of the novel interpolymers of this invention generally range from 140° C. up to about 190° C. The most preferred melt point range for these copolymers is from about 150° C. up to about 185° C. since polymers within this melting point range generally exhibit superior molding characteristics.

An important feature of the novel interpolymers of the present invention is the fact that severe thermal degradation or "unzipping" is not experienced at the elevated temperatures required for molding operations. Coupled with this advantageous feature is the fact that these novel interpolymers exhibit properties of toughness, resilience, strength, and flexibility. Still another important feature of the interpolymers of this invention is their resistance to degradation in the presence of strong caustic solutions. Formaldehyde homopolymers in the past have rapidly decomposed into monomeric formaldehyde upon being treated with a strongly alkaline solution. This disadvantage is not experienced to an appreciable extent with the present novel interpolymers and in many cases the only modification experienced when these are treated with caustic solution is the elimination of the terminal hemiacetal groups from the polymer. This is advantageous in that the remaining polymer is resistant to the action of acids, alkalis, heat, oxidation, and aging. Thus, many of the disadvantages experienced in the prior art formaldehyde polymers have now been overcome, or at least significantly reduced.

The term "polymer" as used in this invention, may be further defined as polymers containing 2 or more monomers as defined above. Thus, interpolymers such as copolymers, terpolymers, tetrapolymers, and the like are all within the ambit of this invention.

The novel polymers of this invention are not to be confused with certain materials produced heretofore. Typical of these different materials are the compositions described in British Pat. 863,176 according to which esters such as diallyl maleate are employed as crosslinking agents in polyoxymethylene. The esters form crosslinking bridges between the polyoxymethylene chains. These cross-linked polymers are described as being insoluble or at least having decreased solubility and an increased polymer softening temperature, i.e., higher polymer melt temperature.

In sharp contrast to the prior art cross-linked polymers, the polymers of this invention retain the beneficial properties of true polyoxymethylene. The novel polymers of this invention are soluble in certain solvents and have a polymer melt temperature approximating that of the pure polyoxymethylene. In addition to the retention of these beneficial properties the polymers of the present invention have increased thermal stability.

A further embodiment of the present invention relates to a process for producing the novel polymers. The novel polymers of this invention are produced by polymerizing any reactive form of formaldehyde which is essentially anhydrous with one or more dihydrocarbyl esters of a dicarboxylic acid as described hereinabove. This polymerization process is conducted in the presence of a catalyst, the nature of which largely depends on the type of formaldehyde being utilized. Thus, when trioxane is being copolymerized with one or more diesters, generally a Lewis acid is employed. However, heterogeneous catalysts, e.g., silicia alumina, are also very active in the copolymerization process. Other catalysts such as Lewis bases are generally preferred when essentially anhydrous gaseous monomeric formaldehyde is being employed in the copolymerization reaction.

The novel process of the present invention can be conducted utilizing a wide variety of polymerization techniques, e.g., bulk polymerization, solution polymerization, vapor polymerization and like procedures.

Bulk polymerization is achieved by mixing any reactive form of formaldehyde such as trioxane with a catalyst and the desired diester monomer(s). Thereafter the reaction mixture is heated to a temperature of from about 60° C. to about 90° C. for a period of time sufficient to copolymerize the reaction mixture. This reaction time generally varies from a matter of a few seconds to one day, a period ranging from about three minutes to twelve hours generally being sufficient. The resulting polymer obtained may then be ground up and/or subjected to other stabilization procedures, e.g., compounded with stabilizers and the like.

Solution polymerization generally comprises contacting a formaldehyde source such as trioxane with a catalyst and the desired diesters in an inert solvent such as a liquid hydrocarbon at a temperature ranging from about −90° C. up to about 200° C. The reaction is generally conducted at a pressure ranging from about atmospheric up to about 15 atmospheres. The reaction mass is stirred and heated for a time sufficient to obtain the desired molecular weight after which the copolymer product is extracted and allowed to dry. Again, subsequent treatments used in the art for improving the properties may be used as desired.

The inert solvents which may be employed in the solution polymerization process are any solvents which are inert to the reactants. Thus, liquid hydrocarbons (paraffins, cycloparaffins, aromatics, or mixtures of these), glycol ethers, monoethers, (dialkyl ethers, dicycloalkyl ethers, diaryl ethers, diaralkyl ethers or mixed ethers in which the organic groups are taken from different classes, vis, alkyl, cycloalkyl, aryl, and aralkyl groups). Saturated hydrocarbons, and the like may be employed. Typical of the solvents are hydrocarbons such as hexane, heptane, octane, cyclohexane, methyl cyclohexane, benzene, toluene, xylene; petroleum distillates such as naphtha, kerosene, gasoline; halogenated hydrocarbon compounds such as carbon tetrachloride, ethylene dibromide, methylene chloride; glycol ethers, such as the dimethyl ether of diethylene glycol, the diethyl ether of diethylene glycol; monoethers such as diethyl ether, dibutyl ether, dicyclohexyl ether, dibenzyl ether, diphenyl ether, methylphenyl ether, and the like.

Vapor polymerization comprises contacting in a reaction zone the vapors of a formaldehyde source such as trioxane and the desired diester monomer(s) in the aerosol state in the presence of a catalyst at temperatures ranging from about $-20°$ C. up to about $200°$ C. The pressure at which the vapor polymerization processes can be conducted generally ranges from atmospheric up to about 200 atmospheres. The polymer may then be withdrawn as it is formed in the reaction chamber. Thereafter optimum workup and/or stabilization procedures may be utilized.

The processes as outlined above are capable of being adapted to a continuous process, a batch process, or semibatch operation; for example, where a vapor polymerization reaction is being conducted it may readily be converted to a continuous process by merely adding the reactants and the catalyst to the reaction zone while recovering the interpolymer as soon as it is formed. An excellent example of a batch process is the bulk polymerization of a formaldehyde source such as trioxane with a diester after which the desired polymer may then be recovered.

Generally it is preferred to employ an essentially anhydrous inert atmosphere over the reaction mass particularly when bulk polymerization techniques are being employed. However, an inert atmosphere may be employed in other polymerization processes such as solution polymerization and vapor polymerization. Typical of the inert gases which may be employed are nitrogen, argon, krypton, neon, helium, and the like. Certain saturated paraffinic hydrocarbons may also be employed as the inert atmosphere where the hydrocarbons are inert to the reaction mass. Examples of paraffinic hydrocarbons which may be employed are methane, ethane, propane, and the like.

The formaldehyde employed as stated herein above can be any reactive form of formaldehyde in the essentially anhydrous state. Monomeric formaldehyde and trioxane are the best known reactive anhydrous forms which may be used. Monomeric formaldehyde can be produced by any of the general prior art methods such as is set forth by Walker in "Formaldehyde," A.C.S., Monograph Series No. 98 (1944). Typical methods employed to obtain monomeric formaldehyde are pyrolyzing paraformaldehyde, polyoxymethylene or other polymeric forms of formaldehyde. However, it is preferred in this invention to employ trioxane since it is easier to handle especially in bulk polymerization processes. On the other hand, in vapor polymerization processes it is more desirable to employ gaseous anhydrous monomeric formaldehyde since this compound is more easily vaporized.

Typical of the Lewis acids which are employed as catalysts in the processes of this invention are inorganic halides, particularly the inorganic fluorides, inorganic fluorides complexed with ethers and amines, methyl alkoxides, sulfonyl halides, metalloidal halides, hydrogen halides, and the like. The most preferred Lewis acid catalysts are boron trifluoride etherate complexes, and phosphorus pentafluoride, since excellent results are achieved.

Typical of the Lewis bases which may be employed in the processes of this invention when using gaseous monomeric formaldehyde monomer are the organophosphines, organostibines, organoarsines, primary amines, secondary amines, tertiary amines, the alkali and alkaline earth metal hydroxides, oxides, peroxides, and the like.

Other catalysts which may be employed in association with gaseous formaldehyde and diester monomers in the present polymerization processes are onium salts, metals, metal alloys, metal carbonyls as well as various oxides, peroxides and hydroxides of the heavy metals.

The types of heterogeneous catalysts may be broadly defined as metal oxides, mixed metal oxides, acid clays, acid treated clays, and ion exchange resins. Acid types of heterogeneous catalysts are used in the polymerization of trioxane while the basic catalysts are employed in the polymerization of monomeric formaldehyde. However, acid ion exchange resins may in some instances be employed in either the copolymerization of trioxane or monomeric formaldehyde with the diester.

Typical examples of the heterogeneous catalysts are silica alumina, silica magnesia, silica zirconia, alumina boria, alumina magnesia, silica gel, Permutit S-2 (which is understood to be aluminum silicate), alumina chromia, Amberlite IR (which is understood to be a phenolic methylene sulfonic cation exchanger produced by the reaction of phenol, formaldehyde and sulfonic acid), montmorillonite, and the like.

Typical examples of the preferred catalysts used when trioxane is employed in the process of this invention are antimony trifluoride, antimony fluoborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorous pentafluoride, hydrogen fluoride, fluosulfonic acid, antimony chloride, stannous chloride, sodium fluoride, potassium fluoride, lithium fluoride, calcium fluoride, magnesium fluoride, barium fluoride, strontium fluoride, lead fluoride, ferric fluoride, ammonium fluoride, boron trifluoride, aluminum bromide, aluminum chloride, hydrogen chloride, sulfuric acid, and the like.

The amount of catalyst which may be employed in the processes of this invention is susceptible to variation. Generally amounts ranging from about 0.001 to about 25 percent by weight of the total reaction mass may be employed. However, the preferred amount of catalyst ranges from 0.01 percent to about 2 percent by weight since within this range polymers having optimum properties such as strength, toughness, and resilience are obtained. The amount of catalyst employed in the present invention, although not critical, forms an important element of the processes, thus it is desirable to keep the catalyst concentration within the preferred range outlined hereinabove. The temperature at which the polymerization process is conducted varies with the type of process employed. Thus, in bulk polymerization processes temperatures ranging from about $50°$ C. up to about $90°$ C. are employed.

In the solution polymerization processes reaction temperatures may vary from about $-90°$ C. up to about $200°$ C., whereas in vapor polymerization processes temperatures between about $-20°$ C. up to about $200°$ C. are employed.

The pressure employed in the polymerization processes of this invention depends generally upon the formaldehyde source and catalyst being used and on the type of process technique being employed. Thus, in solution polymerization and vapor polymerization procedures, the pressure generally ranges from atmospheric up to about 20 atmospheres. These mild process conditions obviate the necessity for expensive, high pressure reaction equipment. In most cases it is preferably to conduct the processes of this invention at atmospheric or ambient pressures.

The processes by which these novel copolymers are produced will be further understood from the following examples. In all the examples all parts are by weight unless otherwise specified.

EXAMPLES I-V

Five copolymerizations are illustrated in Table I employing the bulk polymerization technique. Diallyl phthalate, diallyl itaconate, dibutyl fumarate, diethyl maleate, and diallyl maleate were individually employed as the ester monomers. The technique employed comprised reacting 100 parts of trioxane with the indicated number of parts of the diester in the presence of boron trifluoride dibutyl etherate catalyst and heating the mixture while stirring. The following table sets forth reaction conditions and the results obtained by this copolymerization process.

TABLE I.—BULK COPOLYMERIZATION OF TRIOXANE WITH DIHYDROCARBYL ESTERS

| Example | Monomer | PHR [1] | Cat. [2] | Temp., °C. | Percent conversion | PMT,[3] °C. | $Tn$,[4] °C. | $n_{inh}$ [5] |
|---|---|---|---|---|---|---|---|---|
| I | Diallyl phthalate | 8.6 | 0.115 | 70 | 74 | 175 | 152 | 0.77 |
| II | Diallyl itaconate | 8 | 0.08 | 90 | 10 | 174 | 155 | 0.38 |
| III | Dibutyl fumarate | 8 | 0.08 | 70 | 57 | 179 | 148 | 0.38 |
| IV | Diethyl maleate | 5 | 0.12 | 70 | 56 | 181 | 152 | 1.25 |
| V | Diallyl maleate | 10 | 0.08 | 70 | 58 | 177 | 158 | 0.48 |

[1] PHR—Parts per hundred of diester monomer.
[2] Catalyst concentration—parts per hundred.
[3] PMT—polymer melting temperature.
[4] $Tn$—Crystalline melting point.
[5] $n_{inh}$—Inherent viscosity as measured in alpha-p-chlorophenol containing 2% alpha-pinene at 60° C.

When the above examples are repeated employing esters such as diethyl succinate, diethyl terephthalate, dibutyl bibenzoate, diethyl homoterephthalate, 2-ethylhexyl terephthalate, dioctadecyl itaconate, and the like, similar results are obtained.

EXAMPLES VI–XIV

Nine copolymerization runs are illustrated in Table II employing the solution polymerization technique. The technique employed comprised reacting trioxane and the desired comonomer in a cyclohexane solvent at 55° C. in the presence of boron trifluoride dibutyl etherate catalyst. In all of the examples, the concentration of ester monomer was 5 weight percent. The following table sets forth the reaction conditions and the results obtained by this solution polymerization process.

TABLE II.—SOLUTION POLYMERIZATION OF TRIOXANE WITH DIHYDROCARBYL ESTERS IN CYCLOHEXANE

| Example | Monomer | PHR [1] | Cat. [2] | Temp., °C. | Percent conversion | PMT [3] °C. | $Tn$ [4] °C. | $n_{inh}$ [5] |
|---|---|---|---|---|---|---|---|---|
| VI | Diethyl maleate | 5 | 0.1 | 55 | 60 | 181–86 | 161 | 1.20 |
| VII | Dibutyl maleate | 5 | 0.1 | 55 | 57 | 179–183 | 161 | 0.98 |
| VIII | Dibutyl fumarate | 5 | 0.1 | 55 | 54 | 179–183 | 158 | 0.40 |
| IX | Dimethyl fumarate | 5 | 0.1 | 55 | 54 | 180–184 | 162 | 1.20 |
| X | Diethyl succinate | 5 | 0.1 | 55 | 61 | 184–186 | 159 | 1.13 |
| XI | Dimethyl maleate | 5 | 0.1 | 55 | 65 | 185–190 | 160 | 0.91 |
| XII | Diethyl fumarate | 5 | 0.1 | 55 | 62 | 181–186 | 160 | 1.11 |
| XIII | Dimethyl itaconate | 5 | 0.1 | 55 | 65 | 179–183 | 158 | 0.96 |
| XIV | Dimethyl adipate | 5 | 0.1 | 55 | 13 | 175–180 | 154 | 0.18 |

[1] PHR—Parts per hundred of diester monomer.
[2] Catalyst concentration—parts per hundred.
[3] PMT—polymer melting temperature.
[4] $Tn$—Crystalline melting point.
[5] $n_{inh}$—Inherent viscosity as measured in alpha-pchlorophenol containing 2% alpha-pinene at 60° C.

The novel polymers of the present invention are very resistant to chemical degradation. When these novel polymers are treated with a 10 weight percent aqueous sodium hydroxide solution, at a temperature between room temperature and the reflux temperature of the system, for times ranging from 1 minute to 5 hours, the net polymer loss experienced is very slight under these extreme conditions. For example, the polymer of Example I (trioxane-diallyl phthalate) was subjected to a 10 weight percent boiling sodium hydroxide solution for 10 minutes. The results of this rigorous test are listed in Table III, and compared to a butyrolactone trioxane copolymer.

TABLE III

Comparative caustic degradation

Polymer: Percent recovered
Diallyl phthalate _____ 60.6
Butyrolactone _____ 27.8

Still another demonstration of the thermal and chemical stability of the novel polymers of this invention is found in Table IV. The copolymers listed in Table IV were ground to a fine powder and individually treated with a boiling aqueous solution containing 10 weight percent sodium hydroxide for 30 minutes.

TABLE IV

Caustic degradation for 30 minutes

Monomer: Percent retention
Diethyl maleate _____ 94
Dimethyl fumarate _____ 80
Maleic anhydride _____ 50

From the data in Table IV it is noted that the copolymers of this invention, i.e., trioxane with diethyl maleate; and trioxane with dimethyl fumarate, exhibit a minimum of loss when compared to a trioxane polymer containing maleic anhydride.

A third and most rigid test is exhibited by the data in Table V. In this particular test, the copolymers of the present invention were first treated with an ether solution containing 5 weight percent diphenyl amine after which the ether was evaporated. The polymer powder so-formed was then molded into plaques at a temperature of about 190° C. at 10,000 p.s.i.g. The same treatment was also accorded a polyoxymethylene polymer containing succinic anhydride, a composition not contemplated by the present invention. The plaques so-obtained were weighed and immersed in a boiling aqueous 10 percent sodium hydroxide solution for a period of 5 hours. The plaques were then removed, thoroughly washed, dried overnight, and reweighed to find the percentage of weight loss which occurred. The data listed in Table V demonstrates the results of this most rigid test.

TABLE V.—TREATMENT WITH BOILING CAUSTIC FOR 5 HOURS

| Comonomer | $n_{inh}$ [1] | Percent weight retention |
|---|---|---|
| Diethylmaleate | 1.14 | 74 |
| Dimethyl fumarate | 1.15 | 81 |
| Diethyl succinate | 1.13 | 43 |
| Succinic anhydride | 1.10 | [2] 0 |

[1] Inherent viscosity as measured in alpha-p-chlorophenol containing 2% alpha-pinene at 60° C.
[2] The succinic anhydride polymer completely disintegrated within 2 hours after the initiation of the test, indicating complete thermal and chemical instability.

The plaques obtained from the composition of this invention were essentially bubble-free, rigid, strong and creasable.

In preparing the copolymers of this invention it is sometimes desirable to first submit the raw copolymer product to a caustic treatment to remove any reactive groups, thereby stabilizing the polymers. In treating the crude copolymer for commercial utilization it is desirable to use an alkaline solution having a pH of between about 8 and about 14 at about room temperature up to about 100° C. for a time ranging from about 1 to about 10 minutes. For reasons of economy and time, it is desirable to contact the crude copolymers of this invention with a 10 percent aqueous sodium hydroxide solution. The treated products obtained by this method are more stable to heat, light, and oxidation.

The strong bases which may be used in this preferred after treatment include alkali and alkaline earth metal hydroxides, oxides, carbonates, acetates, and the like; strong organic bases; ammonia, and the like. Typical of these bases which may be employed are potassium hydroxide, calcium oxide, beryllium hydroxide, magnesium oxide, sodium carbonate, sodium acetate, calcium propionate, ammonia, dimethyl amine, diethyl amine, dipropyl amine, dibutyl amine, tetramethyl quanidine, and the like.

In effecting this after treatment system, other than aqueous alkaline systems may be employed. Thus, the appropriate strong base may be dissolved in a dimethyl formamide, benzyl alcohol, methanol, anisole, ethylene glycol, or the like. In some instances alkaline solvent systems which contain a hydrozyl group such as benzyl alcohol, methanol or ethylene glycol, function as the agent of controlled degradation even in the absence of the above basic substances.

Typical examples of the diester monomers which may be employed in the present invention are dimethyl adipate, diethyl adipate, dibutyl adipate, didecyl adipate, dioctadecyl adipate, didodecyl adipate, dimethyl azelate, dipropyl azelate, diheptyl azelate, the dimethyl ester of diglycolic acid, the dibutyl ester of diglycolic acid, the dipropyl ester of diglycolic acid, the dipentadecyl ester of diglycolic acid, dimethyl glutarate, dibutyl glutarate, dipropyl glutarate, dimethyl isophthalate, di-2-ethylhexylphthalate, dioctyl pimelate, didodecyl pimelate, the diethyl ester of pinic acid, the dipropyl ester of pinic acid, the dipropyl ester of suberic acid, the diisopropyl ester of suberic acid, di-t-butyl sebacate, the dimethyl ester of acetylene carboxylic acid, the diethyl ester of acetylene dicarboxylic acid, the methyl ethyl ester of acetylene dicarboxylic acid, the dioctadecyl ester of acetylene carboxylic acid, the dipropyl ester of alpha,alpha-diethyl adipic acid, the dimethyl ester of linoleic acid dimer, the dipropyl ester of cyclohexane dicarboxylic acid, diethyl terephthalate, dibutyl terephthalate, dipropyl phthalate, dioctadecyl homoterephthalate, dimethyl bibenzoate, diallyl bibenzoate, methyl cyclohexyl maleate, didodecyl mesaconate, didodecyl citraconate, o-tolyl octadecyl itaconate, diisopropyl maleate, dioctadecyl maleate, dipentadecyl maleate, didodecyl maleate, diisoamyl fumarate, di-2-ethylhexyl fumarate, octylethyl fumarate, bis-o-tolyl fumarate, diisopropyl itaconate, didodecyl itaconate, bis-dotriacontyl itaconate, diheptyl itaconate, and the like.

Typical of the Lewis acid catalysts which may be employed in the process of this invention are antimony trifluoride, antimony fluoborate, bismuth fluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride, fluosulfonic acid, antimony chloride, stannous chloride, sodium fluoride, potassium fluoride, lithium fluoride, calcium fluoride, magnesium fluoride, barium fluoride, strontium fluoride, lead fluoride, ferric fluoride, ammonium fluoride, thionyl chloride, phosphorus trichloride, aluminum chloride, aluminum bromide, stannic chloride, titanium tetrachloride, zirconium chloride, boron trifluoride diethyl etherate complex, boron trifluoride dibutyl etherate complex, boron fluoride complexes of aryl amines such as aniline, alpha-naphthyl amine, beta-naphthyl amine, diphenyl amine and benzidine, boron trifluoride complexes of pyridine, phenothiazine, glycine, alpha-alanine, semicarbazide, urea, and the like.

Typical examples of Lewis base catalysts which may be employed in the process of this invention are triphenyl phosphine, tritolyl phosphine, trixylyl phosphine, trinapthyl arsine, tributyl phosphine, triethyl stibine, dimethyl phenyl arsine, tricyclohexyl phosphine, methyl dioctyl stibine, dixylyl ethyl arsine, trimethyl amine, triethyl amine, trihexyl amine, diethyl amine, di-N-propyl amine, dioctyl amine, cyclohexyl amine, dicyclohexyl amine, piperidine, N-ethyl piperidine, morpholine, N-methyl morpholine, pyrrolidine, N-ethyl pyrrolidine, butyl lithium, sodium cyanide, cesium hydroxide, strontium hydroxide, rubidium hydroxide, sodium hydroxide, potassium hydroxide, lithium hydroxide, barium hydroxide, calcium hydroxide, sodium oxide, sodium peroxide, barium peroxide, and the like.

Typical examples of onium salts which may be employed as catalysts are trimethyl stearyl ammonium laurate, tetra-N-butyl ammonium laurate, triethyl benzyl ammonium laurate, benzyl trimethyl ammonium nonyl phenolate, dimethyl diammonium acetate, dimethyl diammonium benzoate, dimethyl dioctadecyl ammonium acetate, N,N-diethyl piperidinium chloride, tetra-N-butyl ammonium iodide, N-phenyl ethyl tetramethylene ammonium iodide, dibutyl octadecamethylene ammonium acetate, bis-(tri-N-butyl ammonium iodide)propane, betaine methyl ester of N-methyl-N-phenyl glycine, 1-(carboxy methyl) pyridinium betaine, (carboxy methyl) tridecyl ammonium chloride, triethyl octadecyl phosphonium bromide, tetraethyl phosphonium iodide, tributyl ethyl phosphonium iodide, phenyl ethyl pentamethyl phosphonium acetate, bis-(triethyl phosphonium acetate)butane, tributyl sulfonium bromide, trimethyl sulfonium iodide, phenyl dibutyl sulfonium acetate, cyclohexyl diethoxy sulfonium benzoate, and the like.

Metal alloy catalysts which may be employed in the process of this invention are alloys of aluminum with copper, silver, gold, beryllium, magnesium, calcium, strontium, barium, zinc, cadmium, mercury, silicon, titanium, zirconium, germanium, tin, lead, vanadium, niobium, tantalum, antimony, bismuth, chromium, molybdenum, tungsten, manganese, iron, and nickel. Specific alloys which have been satisfactory in the past are aluminum magnesium alloys, aluminum cobalt alloys, aluminum copper alloys, aluminum copper manganese alloys, aluminum silicon alloys, aluminum zinc alloys, aluminum magnesium titanium alloys, and alloys containing aluminum, cadmium, zinc, calcium and lithium as well as amalgams of all of the alloys listed hereinabove.

Typical of the organometallic compounds which may be used as catalysts in the process of this invention are phenyl lithium, methoxyphenyl sodium, decoxy sodium, copper mercaptide, copper abietate, copper stearate, methyl magnesium iodide, phenyl magnesium bromide, diethoxy magnesium, calcium hydride, dimethyl cadmium, diphenyl mercury, calcium isopropoxide, aluminum stearate, tetraisopropyl titanate, diphenyl tin, triphenyl bismuth, dicyclopentadienyl iron, triethyl aluminum, trimethyl aluminum, tri-N-butyl aluminum, triisopropyl aluminum, cobalt carbonyl, iron carbonyl, nickel carbonyl, and the like.

Typical of the heterogeneous mixtures of catalysts which may be employed in the process of this invention are silica alumina, Amberlite IR (acid form) as described hereinbefore, montmorillonite (mixture of silica alumina and magnesia), silica gel, Permutit S-2 (basic form) as described hereinbefore, alumina chromia, silica magnesia, silica boria, silica zirconia, alumina boria, as well as other metal oxides, mixed metal oxides and ion exchange resins.

Other forms of heterogeneous catalysts which may be used in the process of this invention are disclosed in "Ion Exchange Technology," Academic Press, New York (1956); "Ion Exchange Resins," by Kunin and Myers, John Wiley and Sons (1950); and "Dowex Ion Exchange," The Dow Chemical Company (1958).

Although the polymers of this invention have improved resistance to chemical and physical degradation, nevertheless for some uses it may be desirable to make use of previously known stabilization techniques in order to effect still further improvement in stability. The techniques which may be so used are in general those procedures which have heretofore been successfully used with hitherto known polyformaldehyde polymers and copolymers. Therefore stabilizer additives may be compounded with the novel polymers of this invention. Typical of these stabilizer additives are hydrazines (U.S. 2,810,708); hydrazones (Belgian 597,962); phenols (U.S. 2,871,220); ureas and thioureas (U.S. 2,893,972); sulfides and polysulfides (Belgian 599,409); amines (U.S. 2,920,059 and 2,936,298); oxalic diamides (Belgian 584,257); polysulfonic acids (Belgian 585,164); hydroxy anthroquinone (Belgian 585,165); benzophenones (Australian 230,163) and polyamides (U.S. 3,001,966). These stabilizers may be compounded with the novel interpolymers of this invention after the polymerization reaction has been completed.

Other antioxidants such as the o-substituted phenols may be compounded with novel comonomers of this invention. Typical examples of these antioxidants are 4,4'-thiobis(2,6-di-tert-butylphenol),
4,4'-thiobis(2-methyl-6-isopropylphenol),
4,4'-thiobis(2-ethyl-6-sec-butylphenol),
4,4'-thiobis(2,6-diisopropylphenol),
4,4'-thiobis-(2-methyl-6-tert-butylphenol),
4,4'-thiobis(2-n-butoxy-6-tert-butylphenol),
4,4'-thiobis(2-methoxy-6-sec-butylphenol),
4,4'-dithiobis-(2-n-propyl-6-tert-butylphenol),
4,4'-trithiobis(2-methyl-6-tert-butylphenol),
2,2'-thiobis(4-methyl-6-tert-butylphenol),
2,6-di-tert-butylphenol,
4,4'-methylene bis(2,6-dimethylphenol),
4,4'-methylene bis(2,6-di-tert-butylphenol),
4,4'-methylene bis(2,6-diisopropylphenol),
4,4'-methylene bis(2,6-di-sec-butylphenol),
4,4'-methylene bis[2-sec-butyl-6-(2-hexyl)phenol], and the like, as well as combinations of these.

Similarly the interpolymers may be end capped in lieu of the preferred caustic after treatment step, by reacting the terminal hydroxyl groups of the copolymer with an anhydride such as acetic anhydride (U.S. 2,964,500); or a dialkyl acetal (Belgian 570,884); to esterify the groups.

The polymers may also be subjected to a combination of the compounding of stabilizers and end capping. Thus, one may end cap the crude polymer by reacting the polymer with an anhydride and thereafter compound stabilizers such a hydrazines, phenols, ureas, and the like, with the polymer product.

Another technique by which additional stabilization may be achieved is to rigorously remove catalyst residues from the novel polymers of this invention. Thereupon, if desired, a stabilizer additive or end capping procedure, or both, may be utilized.

A still different combination which may be used to further stabilize the interpolymers involves caustic treatment followed by addition of stabilizers. Any of the stabilizers referred to hereinabove may be employed subsequent to the preferred caustic after treatment step. This combination of caustic after treatment and subsequent addition of stabilizers is the most preferred method of giving additional stabilization to the interpolymers of this invention.

In all cases where a stabilizer additive is used, it is compounded with the interpolymer in a proportion of between about 0.003 and 15 percent by weight, based on the weight of the polymer. It should be noted that the stabilizers may, in some instances, be added prior to the caustic degradation step. However, it is preferred in most instances to add the stabilizers after the caustic degradation step since a polymer is obtained via this method which is more resistant to thermal degradation and oxidative deterioration.

The copolymers of this invention are useful for the preparation of films (as disclosed in U.S. 2,952,878), sheets, funicular structures such as fibers, filaments, bristles, rods, tubes and molding powders. Thus, the copolymers of this invention may be employed in any general use for which known tough and thermally stable thermoplastic polymers have been put.

Typical methods of molding the interpolymers of this invention are those techniques set forth in "Polymer Processes," vol. X, "High Polymers" by Schildknecht, Interscience Publishers, New York (1961). Typical of the described techniques at page 688 are compression molding, jet molding, transfer molding, injection molding, extrusion, etc.

Having thus described this unique invention and its embodiments, it is not intended that this invention be limited except as set forth in the following claims.

I claim:

1. The process of preparing a linear thermoplastic oxymethylene copolymer comprising the step of copolymerizing
   (a) a formaldehyde selected from the group consisting of essentially anhydrous monomeric formaldehyde and essentially anhydrous trioxane, and
   (b) a diester of a dicarboxylic acid, said diester having the formula:

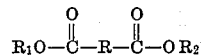

wherein $R_1$ and $R_2$ are monovalent hydrocarbyl groups having up to about 32 carbon atoms; R is a divalent hydrocarbyl radical having from 1 to about 12 carbon atoms; the amount of said diester chemically combined in said polymer ranging from about 0.1 to about 20 percent by weight of said polymer; said polymer having a polymer melting temperature of from about 140° C. to about 190° C. and an inherent viscosity of from about 0.3 to about 5.0 determined by measurement of 0.5 percent by weight of polymer in p-chlorophenol containing 2 percent alpha-pinene at 60° C.; said copolymerization step being conducted under an essentially anhydrous inert atmosphere in an inert solvent and in the presence of from about 0.001 to about 25 percent by weight, based on the total weight of the reactants, of a polymerization catalyst, at a temperature between about −90° C. and about 200° C., and at a pressure of from about atmospheric up to about 20 atmospheres.

2. The process of claim 1 wherein said formaldehyde is essentially anhydrous monomeric formaldehyde.

3. The process of claim 1 wherein said formaldehyde is essentially anhydrous trioxane and said catalyst is a Lewis acid catalyst.

4. The process of claim 1 wherein said diester is diethyl maleate.

5. The process of claim 1 wherein said diester is dimethyl fumarate.

6. The process of preparing a linear thermoplastic oxymethylene copolymer comprising the step of copolymerizing
   (a) a formaldehyde selected from the group consisting of essentially anhydrous monomeric formaldehyde and essentially anhydrous trioxane, and
   (b) a diester of a dicarboxylic acid, said diester having the formula:

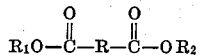

wherein each of $R_1$ and $R_2$ is selected from the group consisting of alkyl, cycloalkyl, and alkaryl radicals, each radical containing up to about 32 carbon atoms; R is selected from the group consisting of alkylene, arylene, and cycloalkylene radicals, each radical having up to about 12 carbon atoms; the amount of said diester chemically combined in said polymer ranging from about 0.1 to about 20 percent by weight of said polymer; said polymer having a polymer melting temperature of from about 140° C. to about 190° C., and an inherent viscosity of from about 0.3 to about 5.0 determined by measurement of 0.5 percent by weight of polymer in p-chlorophenol containing 2-percent alpha-pinene at 60° C., said copolymerization step being conducted under an essentially anhydrous inert atmosphere in an inert solvent and in the presence of from about 0.001 to about 25 percent by weight, based on the total weight of the reactants, of a polymerization catalyst, at a temperature between about −90° C. and about 200° C. and at a pressure of about atmospheric up to about 20 atmospheres.

7. The process of claim 6 wherein said formaldehyde is essentially anhydrous monomeric formaldehyde.

8. The process of claim 6 wherein said formaldehyde is essentially anhydrous trioxane and said catalyst is a Lewis acid catalyst.

References Cited

UNITED STATES PATENTS

| 2,488,883 | 11/1949 | Shokal et al. | |
|---|---|---|---|
| 2,922,768 | 1/1960 | Mino et al. | |
| 3,012,990 | 12/1961 | Kray et al. | |
| 3,123,578 | 3/1964 | Kraft. | |
| 3,219,630 | 11/1965 | Sidi. | |
| 3,296,210 | 1/1967 | Wilson et al. | 260—73 |

FOREIGN PATENTS 699,648   11/1953   Great Britain.

WILLIAM H. SHORT, Primary Examiner

L. P. QUAST, Assistant Examiner

U.S. Cl. X.R.

260—45.7, 45.9, 45.95, 67